(12) United States Patent
Cucchi

(10) Patent No.: US 11,926,393 B2
(45) Date of Patent: Mar. 12, 2024

(54) PROPULSION DEVICE FOR TWO-WHEELED VEHICLE

(71) Applicant: CUCCHI GIOVANNI & C. S.R.L., Milan (IT)

(72) Inventor: Cesare Cucchi, Milan (IT)

(73) Assignee: CUCCHI GIOVANNI & C. S.R.L. (IT)

( * ) Notice: Subject to any disclaimer, the term of this patent is extended or adjusted under 35 U.S.C. 154(b) by 93 days.

(21) Appl. No.: 17/637,844

(22) PCT Filed: Aug. 13, 2020

(86) PCT No.: PCT/IB2020/057630
§ 371 (c)(1),
(2) Date: Feb. 24, 2022

(87) PCT Pub. No.: WO2021/038358
PCT Pub. Date: Mar. 4, 2021

(65) Prior Publication Data
US 2022/0274671 A1    Sep. 1, 2022

(30) Foreign Application Priority Data

Aug. 28, 2019   (IT) .......................... 102019000015162

(51) Int. Cl.
*B62M 6/75* (2010.01)
*B62M 13/00* (2010.01)

(52) U.S. Cl.
CPC .............. *B62M 6/75* (2013.01); *B62M 13/00* (2013.01)

(58) Field of Classification Search
CPC ................................ B62M 6/75; B62M 13/00
(Continued)

(56) References Cited

U.S. PATENT DOCUMENTS

2011/0303474 A1* 12/2011 Kimmich ................. B62M 6/55
180/206.3
2020/0398936 A1* 12/2020 Schmitz ................. B62M 11/04
(Continued)

FOREIGN PATENT DOCUMENTS

CN    104260819 A  *  1/2015
CN    104260819 A     1/2015
(Continued)

*Primary Examiner* — Jacob D Knutson
*Assistant Examiner* — Felicia L. Brittman
(74) *Attorney, Agent, or Firm* — LAUBSCHER & FRETWELL, P.C.

(57) ABSTRACT

A propulsion device for a two-wheeled vehicle includes
  a mechanism for providing traction to a rear wheel for manual advancement of the vehicle
  and a first epicyclic gear reducer coupled with the mechanism and drivable by a first control device configured for varying the geometric configuration of the first epicyclic gear reducer and thus the gear ratio.
A motor for assisting pedalling is interposed between the mechanism for the bottom bracket and the rear wheel and is coupled with
  a second epicyclic gear reducer, drivable by a second control device configured for varying the geometric configuration of the second epicyclic gear reducer and thus the corresponding gear ratio. The second epicyclic gear reducer is coupled and directly in contact with the rear wheel in order to transmit the movement from the propulsion device thereto.

15 Claims, 3 Drawing Sheets

(58) Field of Classification Search
USPC .................................................... 180/206.3
See application file for complete search history.

(56) References Cited

U.S. PATENT DOCUMENTS

| | | | |
|---|---|---|---|
| 2022/0135179 A1* | 5/2022 | Lee .................. | B62J 45/413 |
| | | | 180/206.6 |
| 2022/0274670 A1* | 9/2022 | Deval ............... | B62K 25/005 |

FOREIGN PATENT DOCUMENTS

| | | | |
|---|---|---|---|
| IT | VI20130223 A1 | 3/2015 | |
| JP | 2003254396 A | 9/2003 | |

* cited by examiner

PROPULSION DEVICE FOR TWO-WHEELED VEHICLE

CROSS REFERENCE TO RELATED APPLICATIONS

This application is a § 371 National Stage Entry of PCT/IB2020/057630 filed Aug. 13, 2020. PCT/IB2020/057630 claims priority of IT102019000015162 filed Aug. 28, 2019. The entire content of these applications is incorporated herein by reference.

BACKGROUND OF THE INVENTION

The invention relates to an assisted pedalling propulsion device for a two-wheeled vehicle, in particular for a bicycle of the e-bike type, and the two-wheeled vehicle.

PRIOR ART

The use of various assisted pedalling systems fitted to bicycles is widely known.

Current bicycles provided with assisted pedalling systems generally include, in addition to the traditional bottom bracket mechanism (crank, shaft, crankset with chainring and transmission chain, etc.), an electric motor, fitted to a lower zone of the frame of the bicycle and supplied by a battery, which is also located on the aforesaid frame.

The bicycles are provided with a transmission system, which is necessary for transmitting the muscle power of the cyclist from the shaft of the bottom bracket to the rear wheel and consequently set the vehicle in motion. In the case of bicycles with gears, the system is defined by a transmission chain, a cassette and a crankset. The cassette is fitted to the hub of the rear wheel and consists of one or more sprockets, i.e. circular toothed elements of growing diameter, thus correspondingly with a growing number of respective teeth. The crankset is on the other hand fitted to the shaft of the bottom bracket and consists of one to three toothed chainrings. The gear ratio defined between the bottom bracket mechanism and the rear wheel is determined by the ratio between the diameters of the chainrings and the sprockets.

The chain consists of modular units known as links that couple with the toothing of the sprocket and the chainring: in this manner, the torque generated by the muscle power discharged on the pedal, which rotates the shaft of the bottom bracket mechanism, is transmitted by the transmission chain to the rear wheel to which the cassette is fitted. It is possible to modify the gear ratio of the vehicle manually through the gear shift by acting on the levers present on the handlebar of the bicycle: in this manner, the front or rear derailleur included in the gear shift is moved, which forces the chain to "derail", moving from one sprocket to another (in the case of the rear derailleur) or from one chainring to another (in the case of the front derailleur).

The use of this transmission system has various drawbacks although it is the most used system.

The chain is subject to wear both from environmental agents and following normal use. The corrosion and wear process is accelerated by contact with mud, water, dust and chemical agents on the asphalt and on the terrain on which the bicycle advances. The deterioration of the aforesaid chain and the connected transmission components compromises the correct transmission function. In fact, the chain, in order to be able to operate properly, has to remain constantly taut. The chain tends to extend because of the chain stretching phenomenon: the traction to which the links of the chain are subjected constantly causes link pitch elongation. For the reasons set out above, prolonged use of a worn chain is disadvantageous and even potentially hazardous for the cyclist, the probability being high that a breakage event will occur. In order to avoid the risk of accidents, the user of the bicycle frequently has to replace and/or maintain the chain, with consequent huge expenditure.

Further, the transmission chain, in order to operate correctly, has to be well lubricated. Unexpectedly, during use, the cyclist may come into contact with the chain, get smeared and dirty.

If the chain comes or falls off the crankset whilst the vehicle is being used the cyclist has to first stop the vehicle and refit the chain manually in the correct seat, the hands of the cyclist inevitably getting dirty and smeared because of the lubricant on the chain.

The gear ratios are on the other hand defined by the possible sprocket-chainring combinations. Each combination corresponds to a given metric development, i.e. the distance travelled at each revolution of the pedals. The total number of gears that are at the disposal of a bicycle is the product of the number of sprockets of the cassette multiplied by the number of chainrings of the crankset. It is important to remember that not all gears can be used, or rather, certain "extreme" gears exist the use of which is inadvisable for fear of damaging the transmission components. For example, the gear ratios that result from selecting a chainring and a sprocket placed at a reciprocal maximum distance according to the direction that is transverse to the direction of normal development of the chain cause a condition in which the transmission chain is very tilted with respect to the direction of longitudinal extent of the frame; these gear ratios cannot be used except for short periods because of the great strain to which the chain is subjected (i.e. a state of bending stress) that promotes premature chain wear. A discrete and limited number of gear ratios and thus possible speeds exists, depending on the number of sprockets and chainrings. Increasing the number of sprockets and chainrings in order to increase the possible choice of gear ratios, and thus refine the gear ratio values, increases total dimensions and the weight respectively of the cassette and of the crankset, making the vehicle more difficult to move. In addition, increasing sprockets and chainrings would lead to an excessively taut transmission chain because of the tilt. The structural complexity and the corresponding cost increase that result must also be mentioned.

Further, the presence of the teeth, which have rather pointed or sharp profiles, on the sprockets and on the chainrings constitutes a possible cause of injury if the cyclist accidentally knocks against them.

For the above reasons, it is thus deemed that there is currently ample room for improvement of current motion propulsion and transmission devices for bicycles and bicycles of the e-bike type.

An object of the present invention is to improve current transmission and propulsion devices and to provide a propulsion device, in particular an assisted pedalling device for a bicycle, that is able to overcome the aforesaid limits of the prior art.

Another object of the present invention is to provide a propulsion device, in particular an assisted pedalling device, which is able to ensure improved and optimized motion transmission.

Another object of the present invention is to improve current systems for assisted pedalling, and to provide a technical solution that is advantageous from the economic point of view, also involving a general reduction of weight and overall dimensions. In particular, it is intended to provide a propulsion device that is easily adaptable and fittable to any type of bicycle.

Another object of the present invention is to provide a propulsion device that is such that the use of the vehicle can be more versatile and easier, which provides a wider choice di gear ratios and thus vehicle speed, which is free of the limits in traditional systems.

SHORT DESCRIPTION OF THE DRAWINGS

The features and advantages of the propulsion device according to the invention will be clearer from the following description, with reference to the drawings, in which.

DETAILED DESCRIPTION OF THE INVENTION

Figure 1:
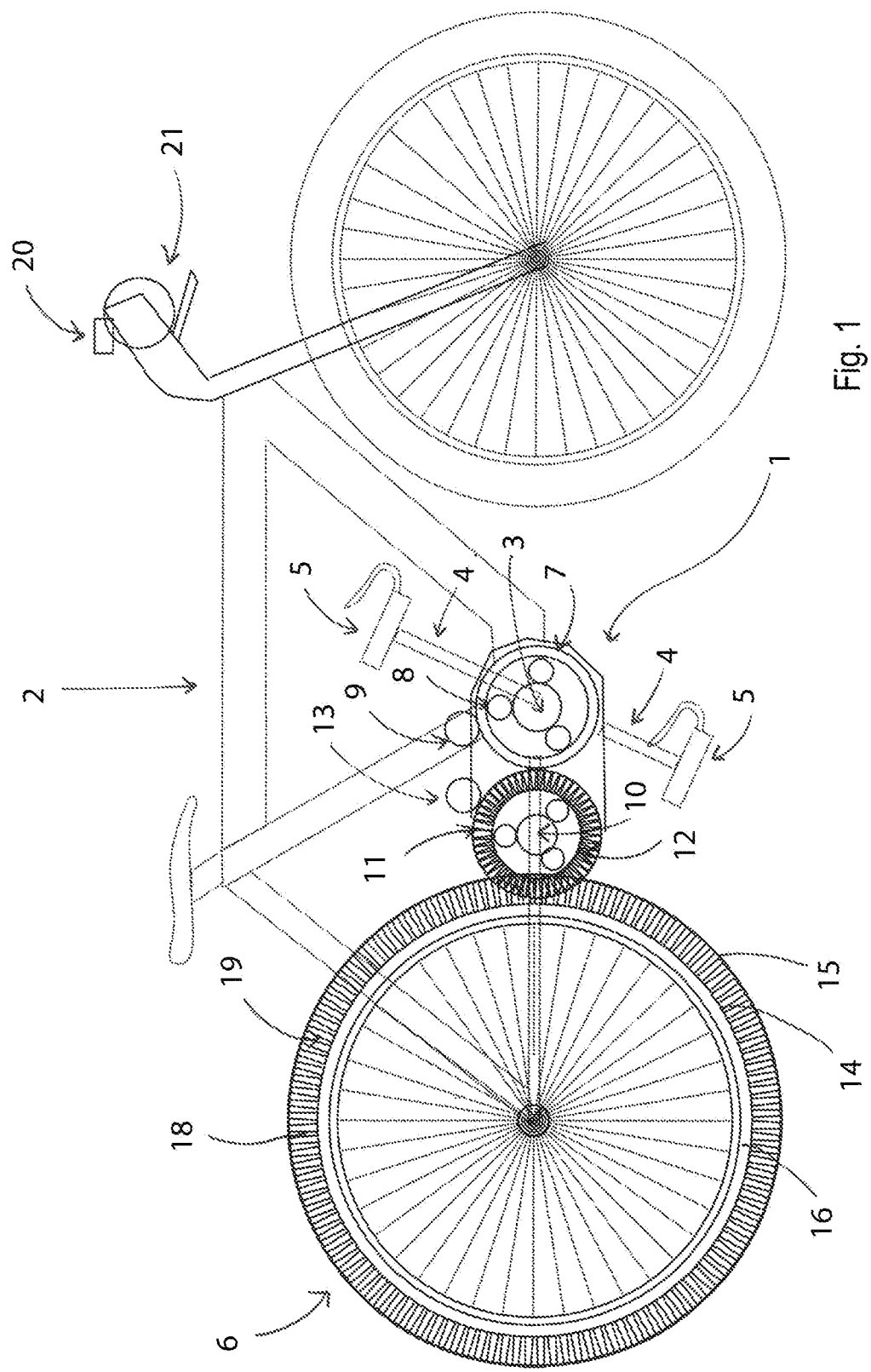
FIG. 1 is a side view of the propulsion device according to the invention, connected to the rear wheel of a two-wheeled vehicle, in particular a bicycle.

With reference to the attached figures, a propulsion device 1 is disclosed below for a two-wheeled vehicle 2, in particular for an e-bike, i.e. a bicycle provided with an electric motor 10 to assist the pedalling of the user, reducing at least partially the physical effort of the user.

The propulsion device 1 is provided with a mechanism 3 for the bottom bracket, to which the cranks 4 and pedals 5 are connected. Manual advancement of the vehicle 2 is made possible owing to the force of traction of the cyclist applied to the pedals 5, transmitted to the rear wheel 6 by a system that is now disclosed in detail.

The mechanism 3 for the bottom bracket is rotated by the system consisting of cranks 4 and pedals 5. The rotary movement is transmitted to a first epicyclic gear reducer 7, coupled with the mechanism 3 for the bottom bracket. By suitably varying the geometric configuration of the inner components of the first epicyclic gear reducer 7, it is possible to modify the gear ratio of the movement to the rear wheel 6.

The first epicyclic gear reducer 7 is serially connected to a second epicyclic gear reducer 11, in one embodiment, completely similar to the gear reducer 5: in this manner the variability range of the gear ratio is increased. The mechanical connection between the first gear reducer 7 and second gear reducer 11 is installed at outer coupling surfaces of the gear reducers, for example by meshing, if these surfaces are provided with toothing. More precisely, in the embodiment shown in the figures, the toothing 8 of the first gear reducer 7 couples with the toothing 12 of the second gear reducer 11.

The second epicyclic gear reducer 11 couples with an electric motor 10 through the assistance of the pedal revolution.

The second epicyclic gear reducer 11 is in turn directly in contact and coupled with a lateral surface 14 of the rear wheel 6, so as to transmit the movement from the propulsion device 1 thereto.

To summarize, the electric motor 10 and the second epicyclic gear reducer 11 coupled therewith are situated between and connected to the rear wheel 6 and the first epicyclic gear reducer 7 coupled with the bottom bracket mechanism 3.

Figure 2:
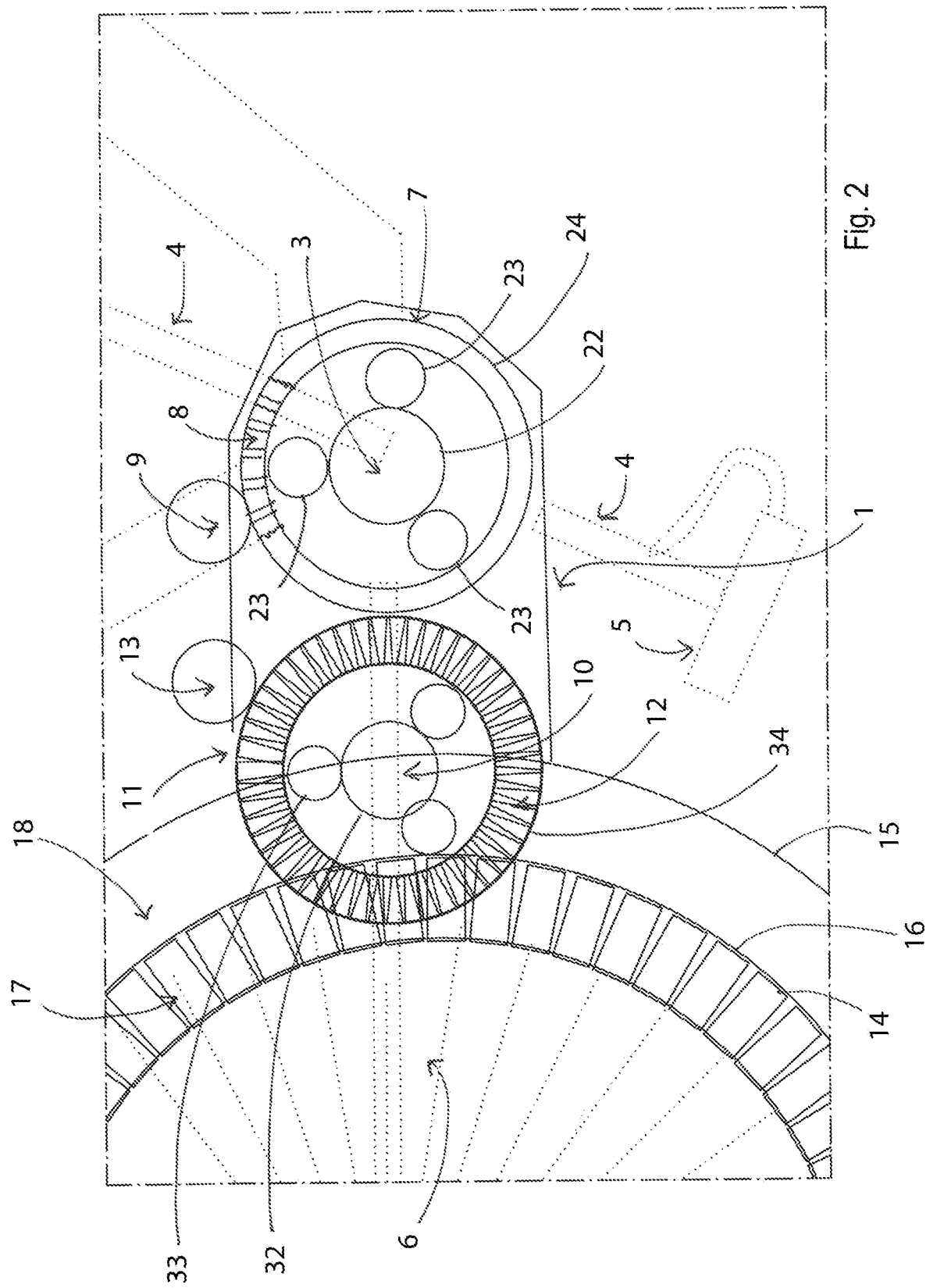
FIG. 2 is an enlarged side view of the propulsion device according to the invention, in particular it shows an alternative way of connection to the rear wheel.
Figure 3:
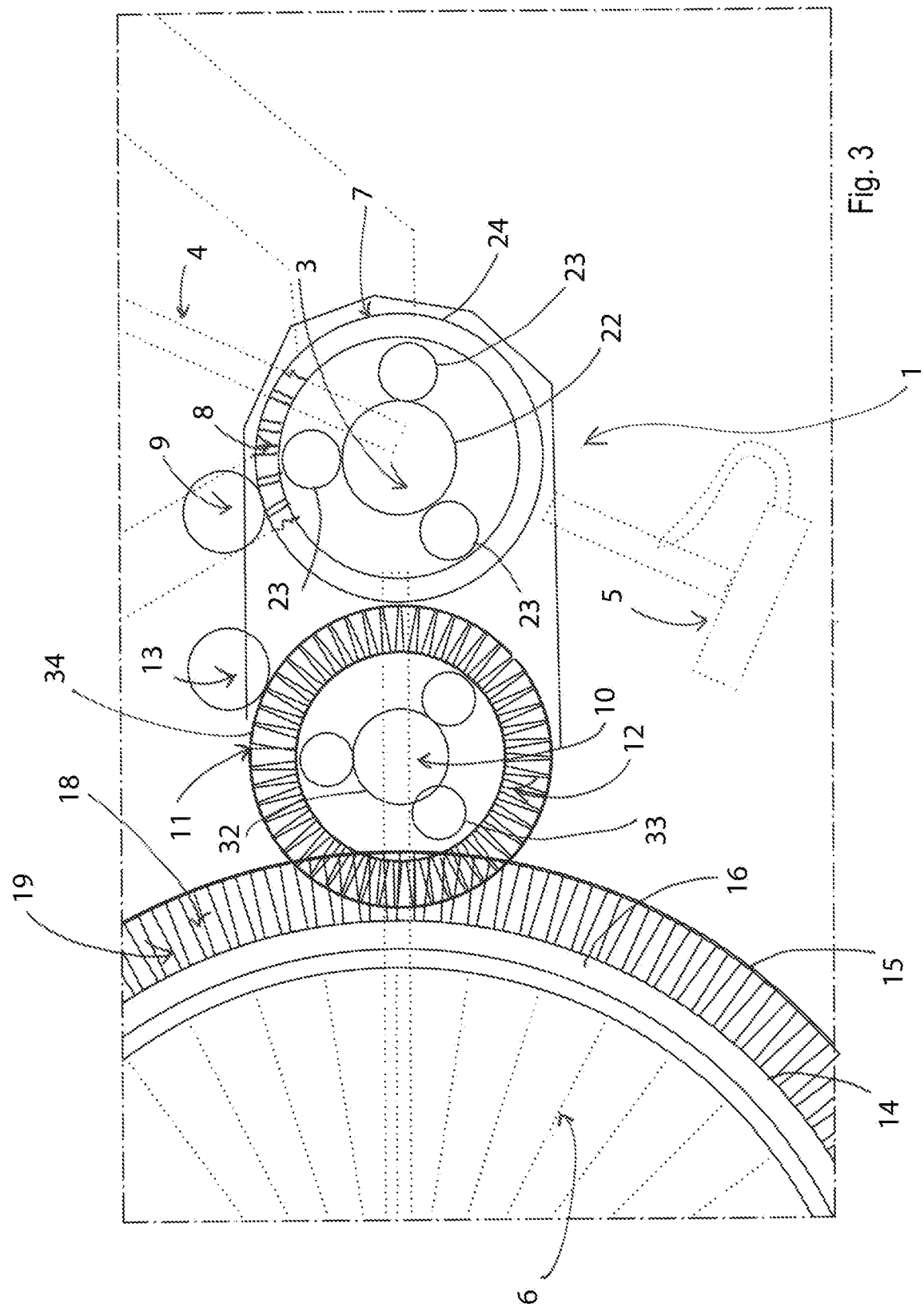
FIG. 3 is an enlarged view of FIG. 1.

Of the many possible coupling embodiments between the rear wheel 6 and the epicyclic gear reducer 8, two are shown: the first is shown in FIG. 2, whereas the second is shown in FIG. 3.

In the first case, the lateral surface 14 is provided on a side 15 having an annular shape, of a rim 16 of the rear wheel 6: on the lateral surface 14 there is obtained a toothing 17 which is shaped for meshing with and receiving transmission-motion from the toothing 12 provided on the second epicyclic gear reducer 11.

In the second case, the lateral surface 14 is provided on a tyre 18 of the rear wheel 6: on the lateral surface 14 a toothing 19 is obtained which is shaped for meshing with and receiving transmission-motion from the toothing 12 provided on the second epicyclic gear reducer 11. The toothing 19 obtained on the lateral surface 14 of the tyre 18 is made of a material having stiffness greater than the remaining part of the tyre 18.

The first epicyclic gear reducer 7 is controlled by a first control device 9 whereas the second gear reducer 11 is controlled by a second control device 13. The first control device 9 and the second control device 13 include a motor unit designed to vary the geometric configuration of said first epicyclic gear reducer 7 and/or said second epicyclic gear reducer 11, then vary the gear ratio of the motion to the rear wheel 6.

The first control device 9 and the second control device 13 are controllable by the rider by a suitable lever element 20 provided on the handlebar 21 of the vehicle 2.

The epicyclic gear mechanisms, like the first gear reducer 7 and the second gear reducer 11, are cogged wheel systems having different diameters, meshed with one another, that collaborate so that the movement is transmitted from one wheel to another. Depending on which components of the epicyclic gear mechanism are locked or left free to move, by then acting on the geometry of the mechanism, it is possible to adjust continuously the gear ratios, both in cases of increasing and reducing the speed.

The main components of the mechanism are the sun gear 22, the planet gears 23 and the ring gear 24. The sun gear 22 is placed in the centre of the mechanism and meshes with one or more sprockets defined as the planet gears 23, housed on a component known as a planet carrier. Generally, the sun gear radius is greater than that of the planet gears. In turn, the planet gears 23 mesh with the ring gear 24. In FIGS. 2 and 3, the components of the first epicyclic gear reducer 7 are illustrated better.

Similarly to the first gear reducer 7, the second gear reducer 11 includes a respective sun gear 32, planet gears 33, and a ring gear 34. The sun gear 32 is placed in the centre of the mechanism and meshes with the planet gears 33, housed on a respective planet carrier.

In the case of the first gear reducer 7, the sun gear 22 is connected and moved by the mechanism 3 for the bottom bracket. On the other hand, in the case of the second gear reducer 11, the sun gear 22 is connected and moved by the electric motor 10.

The vehicle 2 can operate with or without the help of the motor 10. If the electric motor 10 is switched off, the vehicle 2 moves only because of the muscle power of the rider. Movement is transmitted by the bottom bracket mechanism 3 to the first epicyclic gear reducer 7, then to the second epicyclic gear reducer 11, and lastly to the rear wheel 6. On the other hand, in the event of operation of the electric motor 10, this moves at a constant angular speed, whilst the epicyclic gear reducer 8 adjusts the actual traction given to the rear wheel 6, thus the speed at which the vehicle 2 moves. The system is provided with sensors for detecting the movement of the bottom bracket mechanism 3 and consequently activating the motor 10. It is also possible to provide a switch device for disabling if necessary the motor 10 totally.

In particular, the presence of two epicyclic gear reducers (the first gear reducer 7 and the second gear reducer 11) increases the variability range of the gear ratio. This is a change and an advantage over the traditional method for adjusting speed changes: the latter provide a discrete number of possible speeds, because of the possible chainring and sprocket combinations whereas the claimed solution enables the variability range of the gear ratios to be increased. In other words, the value of the gear ratios is variable in a continuous way and not in a discrete way as in traditional bicycle gear changes.

Further, the propulsion device 1 as disclosed is simplified and lightened from the structural point of view: the high number of sprockets and chainrings has been replaced by a direct transmission system based on epicyclic gearing. The absence of chainrings and sprockets results in a system that is less bulky and simpler to move because of the reduction in the weight of the vehicle. The possibility of getting injured by knocking against the toothed wheels is eliminated.

The claimed method of transmission does not involve the use of a transmission chain, resulting in a system that is simpler and more intuitive to use, avoiding the problems linked to the use thereof.

Any element that is part of the propulsion device 1 according to the invention can be replaced by other elements that are equivalent in structural and functional terms, and the materials insofar as they are compatible with the specific use for which they are intended, can be chosen suitably according to the requested requirements and according to the available prior art.

It is possible to configure and size the propulsion device 1 on the basis of specific needs and applications, with possible variations and/or additions to what has been disclosed above and illustrated in the attached drawings without thereby falling outside the claimed area of protection.

The invention claimed is:

1. A propulsion device for two-wheeled vehicles, comprising:
   a bottom bracket, equipped with crank-arms and pedals, suitable for providing traction to a rear wheel for the manual advancement of said vehicle,
   a first epicyclic gear reducer coupled to said bottom bracket, drivable by a first control device configured to vary the geometrical configuration of said first epicyclic gear reducer and therefore the gear ratio,
   an assisted-pedalling-motor that is an electric motor interposed between said bottom bracket and said rear wheel, coupled to
   a second epicyclic gear reducer, drivable by a second control device configured to vary the geometrical configuration of said second epicyclic gear reducer and therefore the relative gear ratio, said second epicyclic gear reducer being coupled and directly in contact with said rear wheel, in order to transmit motion from the propulsion device thereto.

2. The propulsion device according to claim 1, wherein said second epicyclic gear reducer is connected in series to, and meshes with, said first epicyclic gear reducer, so as to increase the range of variability of the gear ratio.

3. The propulsion device according to claim 1, wherein said second epicyclic gear reducer is in contact with a lateral surface of said rear wheel.

4. The propulsion device according to claim 3, wherein said lateral surface is provided on a side, having an annular shape, of a rim of said rear wheel, on said lateral surface there being obtained a first toothing shaped to mesh with, and receive a transmission-motion from, a second toothing provided on said second epicyclic gear reducer.

5. The propulsion device according to claim 3, wherein said lateral surface is provided on a tire of said rear wheel, a first toothing being obtained on said lateral surface and being shaped to mesh with and receive transmission-motion from, a second toothing provided on said second epicyclic gear reducer.

6. The propulsion device according to claim 5, wherein said first toothing obtained on said lateral surface of said tire is made of a material having a greater stiffness than the remaining part of the tyre.

7. The propulsion device according to claim 1, wherein said first control device and/or said second control device include a control motor unit configured to vary the geometry configuration of said first epicyclic gear reducer and/or of said second epicyclic gear reducer.

8. The propulsion device according to claim 7, wherein said first control device and/or said second control device are controllable by a user through a suitable lever element provided on a handlebar of said vehicle.

9. The propulsion device according to claim 1, wherein the said second epicyclic gear reducer is located between, and meshes with, said first epicyclic gear reducer and said rear wheel.

10. The propulsion device according to claim 1, wherein said first reducer and second reducer with epicyclic gear each include:
    a sun gear, arranged in a respective central zone and meshing with
    one or more planet gear, housed on a respective planet carrier, meshing internally with
    a respective inner ring gear.

11. The propulsion device according to claim 10, wherein said sun gear of the first epicyclic gear reducer is connected to and set in motion by said bottom bracket.

12. The propulsion device according to claim 10, wherein said sun gear of the second epicyclic gear reducer is connected to and set in motion by said motor.

13. The propulsion device according to claim 1, comprising sensors for detecting the movement of said bottom bracket and consequently activating said electric motor.

14. The propulsion device according to claim 1, comprising a switch device for totally deactivating said electric motor, if necessary.

15. A two-wheeled vehicle, comprising a propulsion device according to claim 1.

* * * * *